(12) United States Patent
Nicholson (10) Patent No.: US 6,985,403 B2
(45) Date of Patent: Jan. 10, 2006

(54) CONTROL DEVICE FOR CONTROLLING THE POSITION OF A MARINE SEISMIC STREAMER

(75) Inventor: James Richard Stephen Nicholson, Dorchester (GB)

(73) Assignee: QinetiQ Limited, (GB)

( * ) Notice: Subject to any disclaimer, the term of this patent is extended or adjusted under 35 U.S.C. 154(b) by 13 days.

(21) Appl. No.: 10/483,147

(22) PCT Filed: Jul. 2, 2002

(86) PCT No.: PCT/GB02/03057

§ 371 (c)(1),
(2), (4) Date: Jan. 8, 2004

(87) PCT Pub. No.: WO03/008906

PCT Pub. Date: Jan. 30, 2003

(65) Prior Publication Data

US 2004/0196737 A1  Oct. 7, 2004

(30) Foreign Application Priority Data

Jul. 14, 2001 (GB) ..................... 0117186

(51) Int. Cl.
*G01V 1/38* (2006.01)
(52) U.S. Cl. ................ 367/16; 367/19; 114/245
(58) Field of Classification Search ............. 367/15, 367/16, 19, 20, 116, 119, 120; 114/244–246, 114/253–254
See application file for complete search history.

(56) References Cited

U.S. PATENT DOCUMENTS

| 2,325,616 | A | * | 7/1943 | Landweber ............ 114/244 |
| 3,404,565 | A | * | 10/1968 | Barry et al. ........... 73/170.33 |
| 3,793,623 | A | * | 2/1974 | Gongwer ............... 367/173 |
| 3,893,403 | A | * | 7/1975 | Gay et al. .............. 114/244 |
| 4,676,183 | A | * | 6/1987 | Conboy ................. 114/245 |
| 4,711,194 | A | * | 12/1987 | Fowler .................. 114/245 |
| 5,020,033 | A | | 5/1991 | Toplosky |
| 5,619,474 | A | * | 4/1997 | Kuche ................... 367/17 |
| 6,671,223 | B2 | * | 12/2003 | Bittleston .............. 367/19 |

FOREIGN PATENT DOCUMENTS

| EP | 0 939 910 | 7/2000 |
| GB | 2 335 174 | 9/1999 |

* cited by examiner

*Primary Examiner*—Thomas H. Tarcza
*Assistant Examiner*—Scott A. Hughes
(74) *Attorney, Agent, or Firm*—McDonnell Boehnen Hulbert & Berghoff LLP (57) ABSTRACT

A control device (1) for controlling the position of a marine streamer comprising; an annular aerofoil (2), a mount (3) for mounting the annular aerofoil onto and around the streamer; and control means (4a, 4b) for controlling the tilt and/or rotation of the annular aerofoil (2) whereby to adjust the lateral position and/or depth of the streamer.

16 Claims, 3 Drawing Sheets

CONTROL DEVICE FOR CONTROLLING THE POSITION OF A MARINE SEISMIC STREAMER

BACKGROUND OF THE INVENTION

1. Field of the Invention

This invention relates to control devices for controlling the position of a marine streamer such as military towed array or a seismic streamers.

2. Description of Ralated Art

Towed arrays or seismic streamers are generally towed behind a ship and can be thousands of metres in length. For carrying out a seismic survey, a series of streamers are towed, parallel and at a predetermined depth below the water surface. Devices known as "birds" are used to control the depth of the streamer in the water. However, in general, the birds of prior art designs are not able to correct the transverse alignment of the streamers, if, for example, a cross current affects a streamer's position. There is a desire to be able to control such transverse alignment so as to prevent entangling of adjacent streamers and to provide an optimal geometry for data gathering.

Streamers are typically deployed and retrieved by means of a winch. Another problem of many prior art designs is that the birds are too cumbersome to allow them to be permanently fixed to the streamers, the birds, necessarily having to be attached or removed from the streamers at intervals as the streamers are deployed or retrieved. Furthermore, the hydrodynamic stability of prior art designs is questionable, particularly after a period of man-handling in the field.

The problem of controlling the transverse alignment of streamers is to some extent alleviated by a proposal in EP-B-0939910 which proposes a bird having two independently controllable, planar wings configured to provide both vertical and transverse depth control. The same device however is designed with a rigid length that precludes it from stowage whilst attached to the streamer.

BRIEF SUMMARY OF THE INVENTION

The present invention aims to alleviate the disadvantages of the prior art designs discussed above.

In accordance with a first aspect, the present invention there is provided a control device for controlling the position of a marine streamer comprising;

an annular aerofoil, a mount for mounting the annular aerofoil onto and around the streamer; and control means for controlling the tilt and/or rotation of the aerofoil whereby to adjust the lateral position and/or depth of the streamer.

The mount may conveniently comprise a hollow shaft positioned centrally of the annular aerofoil and rotatably mountable about a longitudinal axis of the streamer. Alternatively the mount may be permanently fixed to the streamer and have an outer surface rotatably mounted about the fixed portion of the mount. The mount is preferably arranged so as not to be concentrically aligned with the annular aerofoil. The annular aerofoil may be connected to the mount by radially arranged struts positioned between the mount and the annular aerofoil. The control means typically includes one or more motors for adjusting the rotational or translational position of the annular aerofoil.

In some embodiments, the struts may be of a symmetrical aileron shaped cross-section having a plane of symmetry radial to the plane of the annulus of the annular aerofoil, and the annular aerofoil may be weighted in a portion of its annulus so as to cause the device, when no other loads are applied, to sit with the struts at a predetermined rotational position with respect to horizontal. A plurality of devices weighted at different positions about the annulus of the annular aerofoil may be positioned at a similar distance along the length of adjacent streamers to aid separation of the streamers due to the lifting effect of the differently, rotationally positioned aileron struts. Each control device may be rotated about 2 axes. One substantially in alignment with the longitudinal axis of the streamer and one substantially orthogonal thereto (ie to tilt the annular aerofoil in a forward, backward, left or right direction). Movement of the device may thereby be effected in two dimensions, one given by the lift produced by the aileron struts when the device is rotated and a second produced by the annular aerofoil when the device is tilted.

In alternative embodiments the control means may include one or more ailerons rotatably mounted between the mount and the inner surface of the annular aerofoil. Conveniently a single pair of ailerons are rotatably mounted in diametrically opposing positions. Rotation of each aileron may be carried out independently by a motor. Optionally the ailerons may be operatively connected to two protrusions, one extending radially outwardly from the outer surface of the mount and the other radially inwardly from the inner surface of the annular aerofoil. Optionally, one of the pair of ailerons is fixed in position where it adjoins the annular aerofoil and free to rotate adjacent the mount.

When desired, the control means may be configured to permit the pair of ailerons to be repositioned simultaneously and independently, for example, an opposing pair may each be simultaneously tilted-to the same angle of incidence to provide lift in a single direction without rotation. The radial position of the ailerons about the longitudinal axis of the streamer may equally be adjusted by means of a motor. Rotation of the ailerons' radial position about the longitudinal axis desirably causes a simultaneous rotation of the annular aerofoil about the same axis. Alternatively, the ailerons are provided within a frame work which is freely rotatable within the centre of the annular aerofoil. The framework may, for example, incorporate a cylindrical frame work separated from the inner surface of the annular aerofoil only by bearings which permit the annular aileron and cylindrical frame to rotate independently and optionally be locked to rotate in unison.

Controlling motors may conveniently be powered by electrical cables passing through the streamer and connected to a power source on the marine vehicle carrying the streamers. Alternatively, motors may be battery powered. The controlling means may be purely electromechanical and operated manually or alternatively may be connected with a computerised system configured to manage positioning of the streamers within the water. Such a computerised control means may further comprise a system of transducers for monitoring the actual position of the streamers and the components of the control device.

It is to be understood that for the purposes of this invention, the term annular aerofoil is intended to include annular rings with varied cross sectional, aerodynamic profiles. These cross sectional shapes may range from a simple oval or elliptical shape to more complex aerofoil designs. The annular aerofoil is mounted about the streamer with its attachment points as near as possible coplanar with its centre of lift, thus minimising the forces required to control its orientation.

The main components of the control device i.e. the annular aerofoil and, where incorporated, the ailerons, are of corrosion resistant, lightweight and hard materials which are known in the art and methods of manufacture will no doubt occur to the skilled addressee from his knowledge of the relevant technological field, and may include titanium or aluminium alloys.

The control device of the invention may be removably attachable to a streamer or, preferably, may be permanently fixed to a streamer. The design of the control devices of the invention are sufficiently robust and compact that they may be permanently fixed to a streamer and may be wound with the streamer onto a winch of appropriate design for convenient storage and deployment.

In another aspect, the invention provides a marine streamer comprising; an elongate, flexible cable carrying along its length a plurality of hydrophones and a plurality of control devices for controlling the position of the marine streamer in water, the control devices being spaced along the length of the streamer and permanently mounted thereabout and each comprising;

an annular aerofoil,
a mount for mounting the annular aerofoil onto and around the streamer; and control means for controlling the tilt and/or rotation of the aerofoil whereby to adjust the lateral position and/or depth of the streamer.

The streamer preferably carries electrical cables which carry a power source to the control means. The mount preferably provides for the annular aerofoil to be rotatably mounted to and about the streamer. Other features of the mount may include those features as described in accordance with the first aspect of the invention. The control means may be as previously described in accordance with the first aspect of the invention.

The control devices are preferably positioned at separations of between 100 and 500 metres along the length of the streamer. The streamer may be a military towed array. Optionally, the streamer may be a seismic streamer.

BREIF DESCRIPTION OF THE SEVERAL VIEW OF THE DRAWINGS

For the purposes of exemplification, some embodiments of the invention will now be further described with reference to the following Figures in which.

DETAILED DESCRIPTION OF THE DRAWINGS

Figure 1:
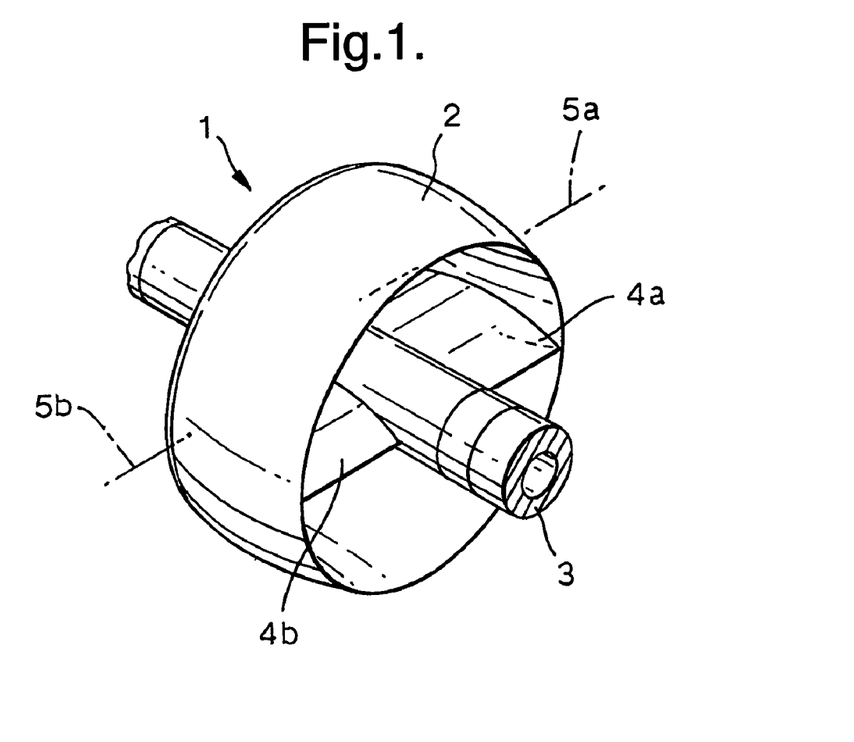
FIG. 1 shows in perspective view an embodiment of a control device of the invention.
Figure 2:
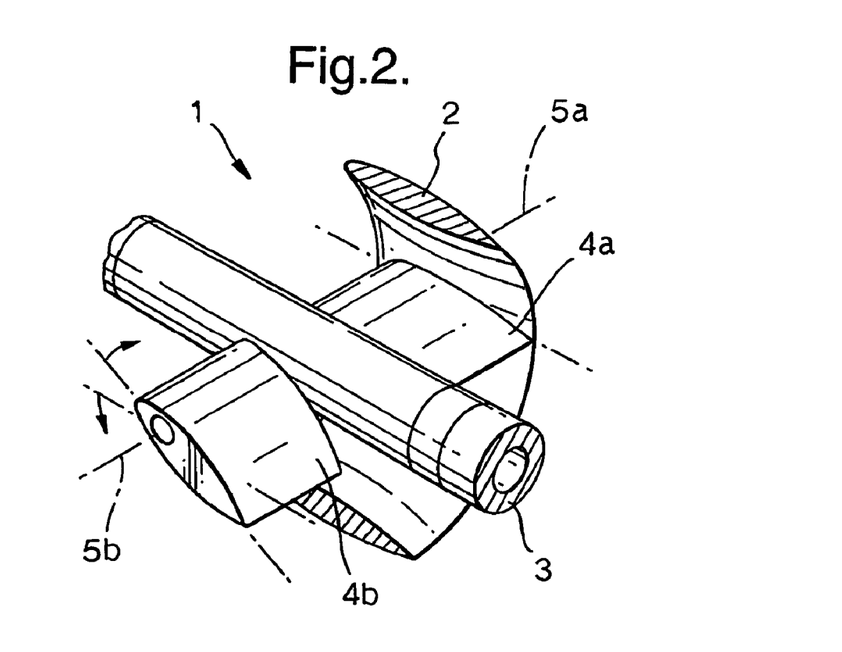
FIG. 2 shows in cutaway the embodiment of the control device as shown in claim 1.
Figure 3A:
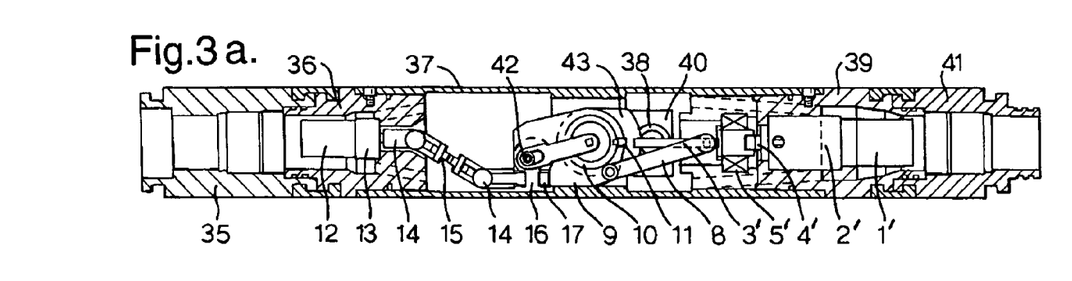
FIG. 3 shows in more detail the componentry of an embodiment of a control device similar to that shown schematically in FIGS. 1 and 2.
Figure 3B:
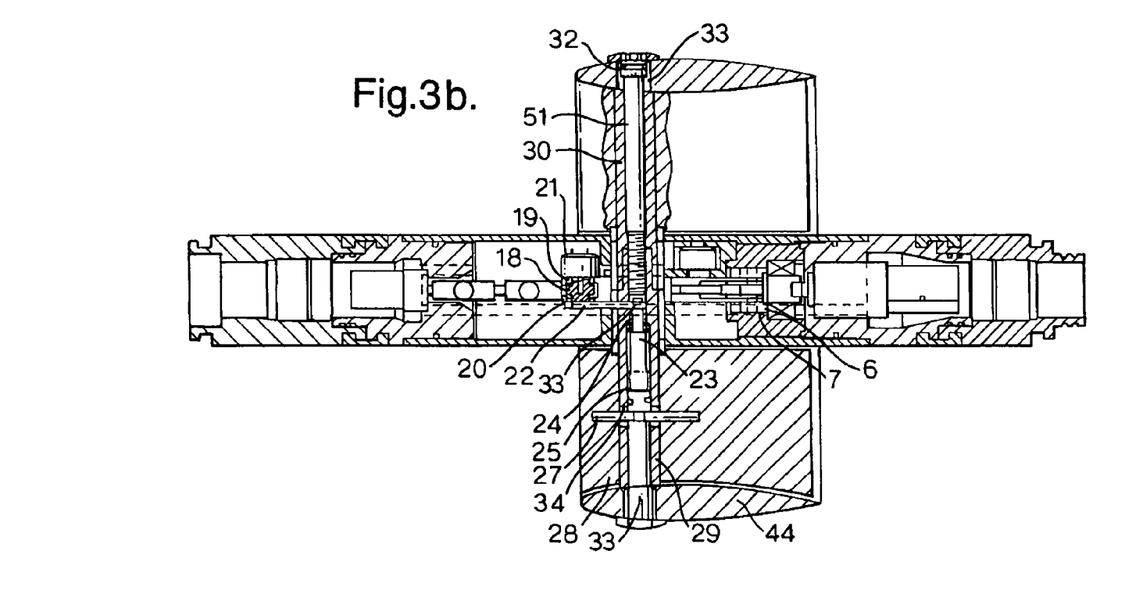
Figure 3C:
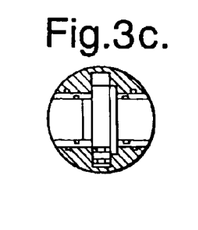
Figure 3D:
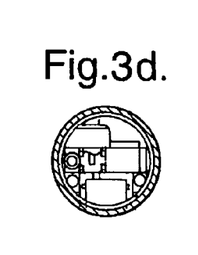

As can be seen in FIGS. 1 and 2, a control device generally designated as 1 comprises an annular lift surface 2 having a generally aerofoil shaped cross section. To the centre of the annular aerofoil is a cylindrical mount 3 which surrounds the circumference of a marine streamer (not shown). The axis of the mount is not concentric with the inner surface of the annular aerofoil. The inner cylinder is fixedly mounted to and around a marine streamer. A pair of ailerons 4a, 4b are rotatably mounted about radial axes 5a, 5b between the outer surface of the mount 3 and two diametrically opposed points with the inner surface of the annular aerofoil. Aileron 4a is fixedly connected with the inner surface of the annular aerofoil and rotatable at its end adjacent the mount. Aileron 4b is rotatable both with respect to the inner surface of the annular aerofoil and the mount.

The rotational position of each aileron 4a, 4b about the axes 5a, 5b is independently controllable by a control system (not shown). The assembly comprising the ailerons 4a, 4b, the axes 5a and 5b and the annular aerofoil 2 may all be rotatably mounted about the longitudinal axis of the marine streamer by means of bearings in the mount 3. Alternatively the mount may be fixed, the streamer being rotatable with the control device under the control of the control means.

Principles of the design of the embodiment illustrated in FIG. 3 are now summarised. The design requirements assume the device should be operable at speeds of up to 30 knots.

Referring to FIG. 3, the angle of attack of the annular aerofoil is controlled by a servo motor 1' which is directly coupled to a gear box 2' which drives an M6 lead screw 3' via a tongue and slot coupling 4', the lead screw is mounted in a double row angular contact ball bearing 5', which is able to deal with both pushing and pulling forces generated by the lead screw.

The lead screw nut 6 is circular, and a slide fit in the casing. Vertical forces generated by the connecting rod are transferred through the lead screw nut 6 to the casing. The connecting rod 8 is connected at one end to the lead screw nut 6 by means of two pins 7, and at the other end to a crank ring 9, whose purpose is to convert the push/pull motion provided by the connecting rod in to rotary motion of the drive tube 10. The crank ring 9 is held in position on the drive tube 10 by a dog point socket set screw 11, which engages with a hole in the drive tube 10.

The forces required from the system to control the ring wing's angle of incidence are calculated in Example 1 below. The forces which the proposed system will provide to control the annular aerofoil's angle of incidence are calculated in Example 2 below.

The aileron system for controlling the rotational position of the annular aerofoil is driven by an electric servo motor 12, the motor is integrated with a reduction gear box 13. The gear box output shaft is connected to a propeller shaft 15 by a Hookes coupling 14. The propeller shaft 15 contains a sliding device within it, so that its length can vary, to accommodate the variation in length required as the aerofoil angle of incidence changes.

The output end of the propeller shaft is connected to a single start worm gear 16 via a second Hookes coupling 14. The worm gear is mounted in ball bearings 17, and engages with a 38 tooth gear wheel 18, which is also mounted in roller bearings 19.

The worm wheel is of conventional design, however the gear wheel is specifically adapted for the purpose by provision of a larger boss than standard, an eccentric stub axle turned on one end and there is no hole through it.

The worm wheel 16 and gear wheel 18 are mounted on the crank ring 9 which controls the angle of incidence of the annular aerofoil, hence the need for a variable length propeller shaft and two Hookes couplings. The advantage of mounting the aileron system so that it moves with the annular aerofoil, is that the position of the aileron relative to the annular aerofoil will not change as the annular aerofoil incidence is changed.

The shaft of the potentiometer which senses the aileron position 21 is fixed in the hole in the centre of the gear wheel 18, on the opposite side to the eccentric stub axle 20. As the maximum movement of the gear wheel for fall aileron incidence in one direction to full incidence in the other is only 190°, a 360° potentiometer 21 will be a satisfactory transducer.

The eccentric stub axle 20 is mated to an operating arm 22, which passes through a slit in the drive tube 10 which controls the annular aerofoil's incidence. It then passes through a slot in the port main wing spar 29 to the centre of the port main wing spar where it engages with the aileron drive shaft 23 which has a square drive cut in to its end. This shaft runs up the port main wing spar via two needle roller bearings 24 and 25 and a thrust bearing together with a seal 34 to prevent the ingress of water down the port main wing spar, to a point where a square drive on the outboard end of the shaft engages with another operating arm 27. The latter arm passes out of the main wing spar via a pair of slits, and is then imbedded in the centre of the aileron foil section 28. The aileron foil is made in two halves (the split is horizontal along its centre line) which are screwed together. This is to permit the operating arm 27 to be imbedded in it.

The main wing spar is shown installed in the lower elevation of FIG. 3. In order to facilitate the requirement of being removable from the array and to aid assembly, it is in two halves port 29 and starboard 30. In order to transmit its movement to the ring wing, the outboard ends have square drives 34 cut in to them, which mate with square holes cut in the annular aerofoil. The annular aerofoil is divided longitudinally across the top of these holes, so that there are upper and lower halves. The two halves are held together in the same manner as the clamps for the 64 mm diameter array (although on a larger scale).

The port side of the main spar 29 is hollow, it contains the aileron drive shaft 23 for the aileron mechanism, described above. At its inboard end, it has a slot to enable it to be slid over the operating arm 22 which engages with the eccentric stub axle. Part of the slotted portion of the in board end of the port spar is threaded, this thread is to accept a 12 mm diameter bolt 51 which is inserted through the starboard half of the main spar 30. Within the head of the bolt 51 is an 'O' ring 32 which prevents water travelling down the inside of the spar.

The central body of the unit is made up from five sections. At the forward end is a forward end unit 35, this has a front end which is identical to the forward end of 64 mm array units (female), and carries a standard connector. The rear end of this unit has a standard 64 mm array unit female end, but it is open and so does not contain a connector.

The next unit is the aileron motor/gearbox unit 36, this unit houses the aileron motor/gearbox, and has 6 mm holes running through it top and bottom on the port side, to carry the wires which run the length of the streamer, and the wires to carry power to the annular aerofoil incidence control motor. On the lower starboard side is a further hole to carry the wires from the potentiometers which sense the annular aerofoil and aileron positions.

The rear of this unit is equipped with a smooth 56 mm diameter section which contains an 'O' ring for the central section to seal on, together with a M56×2 (male) threaded portion. The smooth 56 mm diameter also has a blind M5 screw hole tapped into it together with a recess. This enables a lock washer to be assembled into the recess prior to assembly, and following assembly a M5 cap head screw is assembled to prevent the joint undoing.

The next unit is the central section 37. This unit is bored from either end, both ends carry a plain 56 mm diameter section to seal on the 'O' rings in adjacent sections. These plain sections also have suitably positioned holes for the M5 locking screws mentioned above. Following the plain sections are M56×2 (female) threaded sections.

Following the M56 thread either end, the unit is bored out to 58 mm diameter. The forward end provides the space needed for the crank ring 9 to move through 15° in either direction. The rear space contains the annular aerofoil potentiometer 38, together with the connecting rod 8.

Both of the 58 mm diameter sections contain sections of aluminium (not shown) which fit and are stuck to the walls of the 58 mm diameter sections. These sections have 6 mm diameter holes drilled through them, which line up with the port side wire holes in the aileron motor/gearbox unit, central section and annular aerofoil incidence motor/gearbox section. This will mean that there are two fully lined 6 mm diameter holes through the complete unit for the passage of wires.

The two 58 mm diameter sections are separated by a solid section, which has a vertical rectangular hole cut in it (this can be finish cut, following milling, using a shaping machine), this controls the position of the crank ring in one plane. The solid section provides the metal in which the hole for the drive tube is cut, together with an 'O' ring grove on either side. There is also a 6 mm hole through the solid section top and bottom on the port side for the wires, together with a 4 mm hole through on the lower starboard side for the annular aerofoil potentiometer wires.

The block 40 locates the annular aerofoil incidence potentiometer 38, and is held on to the rear face of the central solid section by two screws (not shown). The annular aerofoil incidence potentiometer has a 28 (0.5 MOD) tooth gear wheel stuck to its shaft, this meshes with a 120 tooth gear wheel which has been cut away to fit the space available, and which is fixed to a spigot which is machined in the side of the cam ring. Over the complete 30° movement of the wing incidence, this will rotate the potentiometer:

$$= 120/28 \times 30 \text{ degrees}$$

$$= 128.6 \text{ degrees}$$

So again a single turn potentiometer will be satisfactory.

The next unit going aft is the annular aerofoil motor/gearbox section 39. This houses the motor/gearbox, coupling, bearing and lead screw. It carries a thread, seal and locking screw similar to those on the aileron motor/gearbox unit. It contains extensions of the 6 mm wire holes on its port side. Again like the aileron motor/gearbox unit it has a standard 64 mm diameter male array end at its aft end, without a connector.

The final part of the central section is the aft unit 41, this has a standard 64 mm female end at its forward end, but without connector, the aft part of the unit is a completely standard 64 mm male end, with connector.

EXAMPLE 1

Forces Required to Control Annular Aerofoil Angle of Incidence

In order to minimise the forces required to control the annular aerofoil angle of incidence, the annular aerofoil must be mounted as near to its centre of lift as practicable.

In practice for a normal wing, the centre of lift usually occurs a distance which is 25% of the chord length from the leading edge. The centre of lift does move slightly according to the angle of incidence. In practice, for symmetrical aerofoil sections the centre of lift may be assumed to lie in a band between 24% and 26% of the chord length from the leading edge, for reasonable angles of incidence.

Because of manufacturing tolerance, some uncertainty about exactly where the centres of lift and drag will be for an annular aerofoil and also to make some allowance for friction within the annular aerofoil pivot and connecting rod bearings; it will be assumed that the maximum driving force required is equivalent to mounting the aerofoil at a point which is 10% of chord away from the actual centre of lift.

If the annular aerofoil is made so that it has a diameter of 250 mm measured from the centre of its chord, then it can be shown that the chord length becomes:

$$100 \times 250/180 = 138.9 \text{ mm}$$

Using a nominal plan area of the annular aerofoil of chord x nominal diameter. That is Area=0.10×0.18 metres$^2$".

The maximum value of $C_L$ achieved at 15° is 1.05. Applying the following:

$$\text{Lift} = (C_L \times \text{Density} \times \text{Area} \times \text{Velocity}^2)/(2 \times g_o)$$

Then at 30 knots:

$$\text{Lift} = (1.05 \times 1000 \times 1.03 \times 0.25 \times 0.1389 \times (15.44)^2)/(2 \times 9.81) \text{ kg.}$$

$$= 456.32 \text{ kg.}$$

$$= 4476.5 \text{ Newtons.}$$

For an actual chord of 103 mm, a 10% of chord offset would be:

$$0.1 \times (103 \times 250)/180 = 14.31 \text{ mm}$$

So the torque required to drive the annular aerofoil at maximum incidence at 30 knots is:

$$\text{Torque} = 4476.5 \times 0.01431 \text{ Newton meters.}$$

$$= 64.1 \text{ Nm.}$$

EXAMPLE 2

Forces Generated to Control Annular Aerofoil Angle of Incidence

The motor selected to control the ring wing angle of attack is a Portescap 28 L 28, this has a maximum intermittent torque rating of 57 mNm. The proposed gear box is from the same manufacturer, and is an R 32.0 with a reduction of 72.3: 1, and an efficiency of 65%. It has a continuous torque rating of 4.5 Nm, and a static torque rating of 20 Nm. If the intermittent rating of the motor is multiplied by the gear reduction and the efficiency:

$$0.57 \times 72.3 \times 0.65 = 2.679 \text{ Nm}$$

This is well within the gear box's continuous rated capacity.

The gear box drives an M6×1.0 screw thread. It is known that to tighten the average M6 screw to yield requires 2.8 kgm of torque, and this will produce a load of 2030 kg.

Because the screw is mounted in a roller bearing, it is reasonable to assume that the torque required to overcome the friction in the head end of the screw will sensibly be eliminated. It would also be a conservative estimate to assume that half of the friction torque to be overcome is generated in the head end. This is because the radius at which the friction is generated, is larger for the head than on the thread.

If we consider the screw being done up one turn under the conditions above, but assume it is lifting a weight, rather than just being tightened, then:

$$\text{Work to tighten screw} = 2.8 \times 2p \text{ kgm}$$
$$= 17.593 \text{ kgm}$$

$$\text{Mechanical work done} = 2030/0.001 \text{ kgm}$$
$$= 2.03 \text{ kgm}$$

$$\text{So total friction torque} = 17.593 - 2.03 \text{ kgm}$$
$$= 15.563 \text{ kgm}$$

So the addition of the ball bearing mounting for the screw will reduce the total work required to:

$$= 15.563/2 + 2.03 \text{ kgm}$$

$$= 9.812 \text{ kgm}$$

Or put another way, the torque required to tighten the original screw is reduced from 2.8 kgm to:

$$= 2.8 \times 9.812/17.593$$

$$= 1.562 \text{ kgm}$$

$$= 15.32 \text{ Nm}$$

Our motor gearbox combination produces 2.679 Nm, so the calculated push/pull force available from the screw will be:

$$2030 \times 2.679/15.32 = 354.98 \text{ kg}$$

$$= 3482.35 \text{ N}$$

Within the proposed design the minimum angle of the connecting rod to the screw axis is 17°, and the minimum effective radius of the connecting rod is 19.97 mm.

The effect of the connecting rod being at an angle to the screw is actually to increase the push/pull force within the connecting rod. This is because the roller bearings which, support the vertical loads applied to the M6 nut by the connecting rod actually contribute to the load within the connecting rod.

Given that the screw force is 3482.35 N, the push/pull force within the connecting rod will be:

$$= 3482.35/\cos 17 \text{ N}$$
$$= 3641.46 \text{ N}$$

This force acting at a radius of 19.97 mm will produce a torque on the tube driving the ring wing of:

$$= 3641.46 \times 19.97/1000 \text{ Nm}$$
$$= 72.72 \text{ Nm}$$

When compared with the required figure of 64.1 Nm calculated in Example 1 this shows that the system will have approximately 13% more torque than required, even at 30 knots with a full 15° angle of incidence.

Certain commercially available lubricants and anti-seizing compounds can reduce the coefficient of friction from the region of 0.19–0.25 down to 0.05, so it would seem that an expected torque of 72.72 Nm may be conservative.

EXAMPLE 3

Annular Aerofoil Response Time

From the zero incidence position, the mechanisms response is slightly asymmetrical, requiring 5.69 turns of the screw in one direction to achieve the full 15° of incidence, and 5.79 turns in the other direction.

If we look at the slower (5.79 turns) direction. At the load required for 30 knot operation the motor speed will vary between 3500–8000 r.p.m. So if we assume an average motor speed of:

$$= (3500 + 8000)/2 \text{ r.p.m.}$$
$$= 5750 \text{ r.p.m.}$$

Then the time taken to apply 15° of incidence will be:

$$= 5.79 \times 72.3 \times 60/5750 \text{ seconds}$$
$$= 4.37 \text{ seconds}$$

At the quoted operational speed of 10 knots, the loads will reduce to 11% of their previous value, and the motor will achieve 8000 r.p.m. throughout the movement, so reducing the time to apply 15° of aerofoil incidence to:

$$= 5.79 \times 72.3 \times 60/8000 \text{ seconds}$$
$$= 3.14 \text{ seconds}$$

EXAMPLE 4

Required Aileron Operating Torque

Two 180 mm diameter annular aerofoil diverters were both rolled about 30° at 10 knots. Given that the counter weight in each annular aerofoil weighed 1 kg, and that it was situated at 90 mm radius, from the centre of the wing. The correcting moment applied when the ring has been rotated 30° is:

$$1000 \times 90 \sin 30 = 45000 \text{ gram mm}$$

Given that the counter weight will have been curved (to fit the aerofoil), its centre of gravity will probably be at a slightly smaller radius, so the correcting moment was probably a little less than the calculated figure.

If we now scale this figure up to account for the intended larger size of the annular aerofoil:

$$\text{Correcting moment} = 45000 \times (250/180)^3 \text{ gram mm}$$
$$= 120563.27 \text{ gram mm}$$
$$= 0.12056 \text{ kgm}$$

The stiffness of the streamer will vary according to the position along the streamer at which the annular aerofoil is placed, the length and stiffness of the tow cable used etc.

It would probably be best if the array is deployed with the annular aerofoil and its aileron feathered, so that the streamer can take up its natural orientation before control operations begin with the annular aerofoil.

Due to the uncertainties in the amount of correcting moment required, it has been decided to design for a correcting moment of 0.25 kgm at 10 knots, this is slightly-more than twice the calculated figure above.

When scaled up to 30 knots, this becomes 2.25 kgm.

EXAMPLE 5

Correcting Moment Generated by the Aileron System

The aileron has the same chord length as the struts (138.9 mm), and occupies the complete half span between the central control body and the annular aerofoil. This gives it a span of:

$$= 125 - 21/2 - 64/2 \text{ mm}$$
$$= 82.5 \text{ mm}$$

It is supported on the annular aerofoil support shaft, and pivots about it. The aileron has an aspect ration of:

$$= 82.5/138.9$$
$$= 0.594$$

The proximity of the annular aerofoil and the central control body to the tips of the aileron, will have a profound effect on its apparent aspect ratio, making it appear very much larger than it actually is. If we assume that the aileron's effective aspect ratio is 2, then the following values of $C_L$ may be expected.

| Angle of incidence degrees | Coefficient of lift | Increase in Coefficient of lift for 5° incidence increase |
| --- | --- | --- |
| 20 | 1.02 | 0.26 |
| 15 | 0.76 | 0.24 |
| 10 | 0.52 | 0.26 |
| 5 | 0.26 | 0.26 |

From which it can be seen that the minimum increase in $C_L$ for 5° increase in incidence is 0.24 when the angle of incidence is increased from 10° to 15°. So using this figure when the aileron is given 5° of incidence to the annular aerofoil, the additional lift force generated will be:

$$= (C_L \times \text{Density} \times \text{Area} \times \textit{Velocity}^2)/(2 \times g_o)$$
$$= (0.24 \times 1000 \times 1.03 \times 0.0825 \times 0.1389 \times (15.44)^2)/(2 \times 9.81) \text{ kg}$$
$$= 34.42 \text{ kg}$$

The effective radius at which this force is applied is:

$$= 82.5/2 + 32 \text{ mm}$$
$$= 73.25 \text{ mm}$$

So the effect of applying 5° of incidence to the aileron will be to apply a torque of:

$$= 34.42 \times .07325 \text{ kgm}$$
$$= 2.52 \text{ kgm}$$

to the annular aerofoil.

(Target 2.25 kgm)

Using the 'C' Group data sheet coefficients, the $C_L$ value for 20° is 1.02 (when 15° of incidence is applied to the annular aerofoil together with 5° of additional aileron incidence), however this value of $C_L$ is unrealistic when the complete annular aerofoil has a best $C_L$ value of 1.05 at 15°, based on projected area only (actual area is three times projected area). It would seem reasonable to suppose that as the annular aerofoil is actually a tri-plane, that the proportion of the $C_L$ value contributed by the central section is 1/3. If we assume that the extra 5° of incidence behaves as normal, then $C_L$ will be:

$$= 1.05/3 + 0.24$$
$$= 0.59$$

So the maximum total lift force on the aileron will be:

$$= (0.59 \times 1000 \times 1.03 \times 0.0825 \times 0.1389 \times (15.44)^2)/(2 \times 9.81) \text{ kg}$$
$$= 84.62 \text{ kg}.$$

If it is assumed that the aileron can be mounted within 5% of chord length of the centre of lift, then the hydrodynamic out of balance moment will be:

$$= 84.62 \times 138.9 \times 0.05 \text{ kgmm}$$
$$= 0.588 \text{ kgm}$$

The frictional torque required to rotate the aileron about its shaft approximates to:

$$= \text{Force} \times \text{Coefficient of friction} \times \text{Radius}.$$
$$= 84.62 \times 0.1 \times 0.012 \text{ kgm}$$
$$= 0.102 \text{ kgm}$$

If these two torques are now added together, the total torque required to drive the aileron is:

$$= (0.588 + 0.102) \times 9.81 \text{ Nm}$$
$$= 6.77 \text{ Nm}$$

The motor selected to drive the aileron system has an intermittent torque rating of 14.5 mNm, and a continuous rating of 5.9 mNm.

This is connected to a gear box having a maximum dynamic output torque rating of 100 mNm. The reduction ratio will be 5:1, the efficiency of this gear box is not known, but will be assumed to be 80%, so maximum available torque from gear box:

$$= 14.5 \times 0.8 \times 5 \text{ mNm}$$
$$= 58 \text{ mNm}$$

Continuous torque rating:

$$= 5.9 \times 0.8 \times 5 \text{ mNm}$$
$$= 23.6 \text{ mNm}$$

No figures are available for the efficiency of hooks couplings, so for the purposes of this exercise, a very conservative figure of 95% will be assumed for each joint. So torque available to drive the worm wheel;

$$\text{Intermittent} = 58 \times 0.95 \times 0.95 \text{ mNm}$$
$$= 52.3 \text{ mNm}$$

$$\text{Continuous} = 23.6 \times 0.95 \times 0.95 \text{ mNm}$$
$$= 21.3 \text{ mNm}$$

The worm and wheel gear box has a reduction ratio of 38:1, the efficiency of similar gearboxes is known to be of the order of 60%, in order to err on the side of safety, it will be assumed that this gear arrangement is 50% efficient. So the gear box output will be:

$$\text{Intermittent} = 52.3 \times 38 \times 0.5 \text{ mNm}$$
$$= 993.7 \text{ mNm}$$

$$\text{Continuous} = 21.3 \times 38 \times 0.5 \text{ mNm}$$
$$= 404.7 \text{ mNm}$$

The wheel of the gear box drives a crank with a 3 mm throw, so the driving force available at the crank is:

$$\text{Intermittent} = 993.7/3 \text{ N}$$
$$= 331.2 \text{ N}$$

$$\text{Continuous} = 404.7/3 \text{ N}$$
$$= 134.9 \text{ N}$$

When the crank is at the position of zero aileron incidence to the annular aerofoil, it is able to apply a force of 331.2 N to the aileron operating arm, at a radius of 38 mm, so applying a torque to the aileron of:

$$= 331.2 \times 0.038 \text{ Nm}$$
$$= 12.58 \text{ Nm}$$

As the crank rotates to produce the full incidence of the aileron, the effective throw of the crank reduces as the Cosine of the angle through which it has moved, so that as full incidence is approached, the mechanical advantage of the crank over the aileron approaches infinity. As a consequence, a torque of at least 12.58 Nm is always available to drive the aileron. (Maximum requirement 6.77 Nm).

The gear manufacturer's literature indicates that the worm and wheel selected are suitable for continuous operation at 760 mNm of torque. If this limitation is placed on the system, then the maximum torque which can be applied in the zero incidence position is:

$$= 12.58 \times 760/993.7 \text{ Nm}$$
$$= 9.62 \text{ Nm}$$

This is still some 42% more than the maximum calculated requirement of 6.77 Nm.

In order to apply full aileron incidence, the crank will have to rotate 95°. In order to rotate the crank 95°, the motor will have to rotate:

$$= 95/360 \times 38 \times 5 \text{ revs}$$
$$= 50.14 \text{ revs}$$

At its maximum intermittent load rating, the motor is able to rotate at 4000 r.p.m., so the time taken to apply full aileron will be:

$$= 50.14/4000 \times 60 \text{ sec}$$
$$= 0.76 \text{ sec}$$

Stress Analysis

The main aileron spar is made from stainless steel to specification BS S145, this is particularly suitable for this application, as it can be through hardened by a very moderate heat treatment process, which means that the item can be machine finished in the soft condition, and there will be no distortion on hardening. The steel is hardened to about 400–455 Vickers, which is equivalent to 1290 N/mm$^2$. As it is a hard material it is reasonable to suppose that the 0.2 proof stress will be in the region of 80% of this value, or 1032 N/mm$^2$.

If it is assumed that the stress within the material should not reach more than ⅔ of the proof stress, then the acceptable stress level for this material will be:

$$= 1032 \times 2/3 \text{ N/mm}^2$$
$$= 688 \text{ N/mm}^2$$

The spar is to withstand a central load placed on it of 1 tonne (9810 N). If we consider the spar as two cantilevers protruding from the central body, and that the load is applied to the spar at the centre of the annular aerofoil thickness, then:

$$\text{Maximum applied bending moment} = 9810/2 \times (125 - 32) \text{ Nmm}$$
$$= 456165 \text{ Nmm}$$

If the spar is considered to be a tube with a 3 mm wall thickness, as it is within part of central body, then:

$$\text{Second moment of area} = \text{pi} \times (d_1^4 - d_2^4)/64$$
$$= 3.142 \times (24^4 - 18^4)/64 \text{ mm}^4$$
$$= 11133.019 \text{ mm}^4$$

The maximum stress within the material at the point where it enters the central body is given by:

$$\text{Stress} = \frac{\text{Bending moment} \times \text{distance from outermost fibre to neutral axis}}{\text{Second moment of area}}$$

$$= (456165 \times 24/2)/11133.019 \text{ N/mm}^2$$
$$= 491.69 \text{ N/mm}^2$$

This is well within the estimate of the acceptable stress given above.

Figure 4:
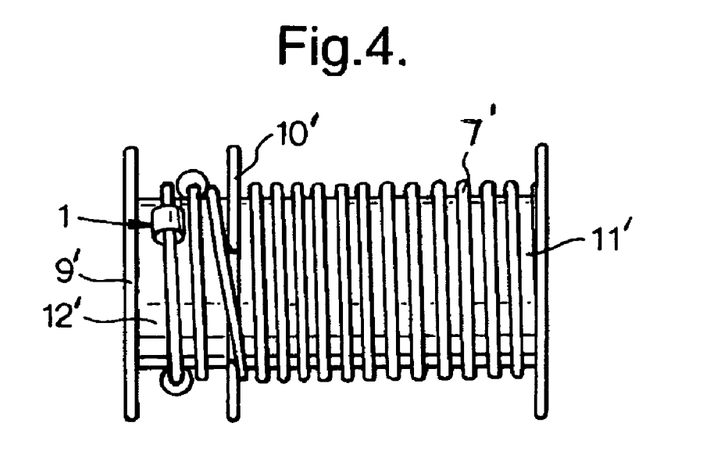
FIG. 4 shows an embodiment of marine streamer according to the invention wound on a winch in a first configuration.
Figure 5:
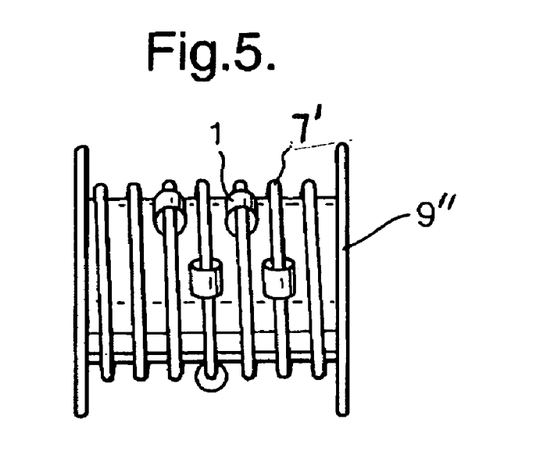
FIG. 5 shows an embodiment of marine streamer according to the invention wound on a winch in a second configuration.

As can be seen from FIGS. 4 and 5, a marine streamer according to the invention comprises a streamer 7' of generally conventional construction but characterised by the inclusion of a plurality of control devices 1 permanently fixed at periodic distances along the length of the streamer. In FIG. 4, the streamer 7' is wound in a first configuration where lengths of streamer not carrying a control device 1 are wound onto a first barrel 11' of a winch 9', while lengths of the streamer which carry a control device are wound over a second barrel 12' of winch 9'. The two wound portions of the streamer are separated by a slotted, circular separator 10'. The cable of the streamer can be passed through the slots of the separator to maintain a compact winding on the winch.

In FIG. 5, the entire streamer 7' with control devices 1 is wound on a single barrel of a winch 9". This arrangement is likely to be less compact in a radial dimension than that of FIG. 4 and more prone to tangling, however, it may be advantageous in that it may be quicker to wind in and easier to automatically wind in.

It is to be understood that the foregoing specific descriptions are purely exemplary and are not intended to be limiting of the true scope of the invention as claimed in the appended claims.

What is claimed is:

1. A control device for controlling the position of a marine streamer comprising;
    an annular aerofoil;
    a mount for mounting the annular aerofoil onto and around the streamer; and at least two members extending between the mount and the annular aerofoil at respective circumferential locations and being movable with respect to the mount to adjust the angle of incidence and the rotational position of the annular aerofoil, whereby to control both the depth and the lateral position of the streamer in use of the device.

2. A control device as claimed in claim 1 wherein the mount comprises a hollow shaft positioned centrally of the annular aerofoil and is rotatably mountable about a longitudinal axis of a streamer.

3. A control device as claimed in claim 1 wherein the mount is permanently fixed to the streamer and has an outer surface rotatably mounted about the fixed portion of the mount.

4. A control device as claimed in claim 1 wherein the mount is not concentric with the annulus of the annular aerofoil.

5. A control device as claimed in claim 1 wherein the annular aerofoil is connected to the mount by radially arranged struts positioned between the mount and the annular aerofoil.

6. A control device as claimed in claim 5 wherein the struts have a symmetrical aerofoil shaped cross-section.

7. A control device as claimed in claim 1 wherein one said member is rotatably mounted with respect to the mount and fixedly connected to the annular aerofoil whereby movement of said member is effective to adjust the angle of incidence of the annular aerofoil.

8. A control device as claimed in claim 1 wherein one said member comprises an aileron rotatably mounted between the mount and the annular aerofoil whereby movement of said member is effective to adjust the rotational position of the annular aerofoil.

9. A marine streamer comprising:
    an elongate, flexible cable carrying along its length a plurality of hydrophones and a plurality of control devices for controlling the position of the marine streamer in water, the control devices being spaced along the length of the streamer and permanently mounted thereabout and each comprising:
    an annular aerofoil,
    a mount for mounting the annular aerofoil onto and around the streamer; and at least two members extending between the mount and the annular aerofoil at respective circumferential locations and being movable with respect to the mount to adjust the angle of incidence and the rotational position of the annular aerofoil, whereby to control both the depth and the lateral position of the streamer in use of the device.

10. A marine streamer as claimed in claim 9 wherein the annular aerofoil is mounted about the streamer with its attachment points as near as possible in the plane of its centre of lift.

11. A marine streamer as claimed in claim 9 wherein the control devices are positioned at separations of between both 100 and about 500 metres along the length of the streamer.

12. A marine streamer as claimed in claim 9 wherein the streamer is a seismic streamer.

13. A control device for controlling the position of a marine streamer comprising:
    an annular aerofoil;
    a mount for mounting the annular aerofoil onto and around the streamer;
    and control means for adjusting the angle of incidence and the rotational position of the annular aerofoil, whereby to control both the depth and the lateral position of the streamer in use of the device;
    said control means comprising a single pair of ailerons which are rotatably mounted in opposed positions with respect to the mount and connect the mount to the annular aerofoil, a first of said ailerons being fixedly connected to the annular aerofoil and rotatably mounted with respect to the mount and the second of said ailerons being rotatably mounted with respect to both the mount and the annular aerofoil.

14. A control device as claimed in claim 13 wherein the control means incorporates one or more electro-mechanical motors for controlling the rotational position of the ailerons about their axes of rotation.

15. A control device as claimed in claim 13 wherein there is a plurality of ailerons, and the rotational position of at least one of the ailerons about its axis of rotation is controllable independently of the rotational position of the other aileron about its axis of rotation.

16. A method for winding onto a winch a marine streamer comprising an elongate flexible cable carrying along its length a plurality of hydrophones and a plurality of control devices for controlling the position of the marine streamer in water, the control devices being spaced along the length of the streamer and each comprising an annular aerofoil, a mount for mounting the annular aerofoil onto and around the streamer and control means for adjusting the angle of incidence and/or rotational position of the aerofoil whereby to control the depth and/or lateral position of the streamer;
    the barrel of the winch being separated into two barrel portions by a separator having a plurality of slots arranged around its perimeter;
    the method comprising winding lengths of the streamer not carrying a control device about a first portion of the barrel and winding portions of the steamer carrying a control device about the second portion of the barrel, while passing connecting portions of the streamer through the slots in the separator.

* * * * *